United States Patent Office 3,382,202
Patented May 7, 1968

3,382,202
POLYURETHANE COMPOSITIONS CONTAINING FATTY ACID AMIDES AND INERT, PARTICULATE SOLIDS
Frederic J. Forrester, Somerville, N.J., and Stanley Lustig, Park Forest, Vytautas Michael Putrius, Chicago, and William Frederick Underwood, Oak Park, Ill., assignors to Union Carbide Corporation, a corporation of New York
No Drawing. Filed Aug. 27, 1964, Ser. No. 392,604
29 Claims. (Cl. 260—32.6)

ABSTRACT OF THE DISCLOSURE

Anti-blocking characteristics can be imparted to structures obtained from normally tacky polyurethanes when there is incorporated into the resin formulation an amide of a fat-forming fatty acid in combination with an inert, finely divided solid.

---

This invention relates to plastic compositions and more particularly, to antiblocking system for polyurethanes which normally yield tacky structures such as films or fibers.

Self-sustaining polyurethane films possess many highly desirable properties such as, high tensile strength, and high resistance to abrasion, hydrocarbons, air diffusion and aging. However, in such films other characteristics are found to be present such as, the surfaces of such film may become severely adhered to each and to exhibit a high coefficient of friction. This phenomenon of sheets of film adhering to one another when superimposed is called "blocking." It has been found also, for example, in the adherence of the inner walls of melt-extruded tubing to each other which makes opening of the tube difficult or even impossible.

An object of this invention is to provide polyurethane compositions for producing shaped structures such as films and fibers exhibiting a greatly reduced tendency to block or be tacky.

Another object of this invention is to provide polyurethane films with improved antiblocking characteristics without deleteriously affecting the resilience and flexibility of the polyurethane.

Other and additional objects will become apparent hereinafter.

It has now been found that when relatively large quantities of an amide of a fat-forming fatty acid as hereinafter more specifically explained, in combination with an inert finely divided, particulate solid are incorporated, the required degree of antiblocking can be obtained in the normally tacky film or fiber forming polyurethanes.

The composition for use in the formation of non-tacky, non-blocking formed structures from polyurethanes, comprises a normally tacky structure forming polyurethane, and at least 1.5 parts by weight of the composition, of an additive system to impart substantially non-blocking and non-tacky characteristics to the structure. The additive system consists essentially of an amide of a fat-forming fatty acid, said amide being present in at least about 0.5 part by weight, and an inert, finely particulate solid in an amount of at least 1 part by weight.

The polyurethanes of the present invention are the polyesterurethanes, polyesteretherurethanes, polyetherurethanes, modifications of such polyurethanes and mixtures thereof which normally yield tacky structures such as films or fibers.

Illustrative examples of polyesterurethanes are found in U.S. Patent 2,871,218. Such polyurethanes are tough essentially linear elastomers, and are the reaction product of (1) one mol of an essentially linear hydroxyl terminated polyester of a saturated, aliphatic glycol having from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus, in the presence of (3) from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction product. These polyesterurethane elastomers are characterized by being thermoplastic, extrudable, tacky, highly resilient, moldable, molten at elevated temperatures, substantially free of cross-links and substantially soluble in dimethyl formamide.

The selection of specific polyesters, glycols and diisocyanates as well as the method employed for obtaining the aforementioned substantially linear product is set forth in detail in the aforementioned U.S. Patent 2,871,218.

U.S. Patent 3,097,192 discloses other illustrative examples of linear, polyesterurethanes such as polyesterurethane-urea polymers wherein the polyester segment is the residue on removal of terminal OH groups from a hydroxyl-terminated polyester having a melting point below about 60° C. and a molecular weight about 600, the said segment being connected through urethane linkages to a second segment, said second segment being at least one repeating unit of a urea polymer having a melting point above about 200° C. in its fiber-forming molecular weight range (about 10,000), said second segment containing in the polymer chain chemically united to said urethane linkage, a symmetrical divalent aromatic radical free of fused rings.

Illustrative polyethers for use in obtaining polyurethane elastomers are polyalkylene ether glycols such as the mixed polyglycol of ethylene propylene, polytetramethylene glycol, polypropylene glycol, and polyethylene glycol, etc., the latter of which is sold under the name of "Carbowax 1000" and has a molecular weight of about 1000.

Polyethers which have a molecular weight about 700, as well as those with a molecular weight as low as 500 to 600, or as high as 5000 or even somewhat higher may be used, depending upon the type of product desired. Other suitable polyethers besides the aforementioned mixed polyalkylene ether glycols such as poly(ethylene-propylene) ether glycols are polytrimethylene ether glycol, polyneopentylene ether glycol, and polypentamethylene ether glycol and mixtures of these. Best results are obtained with a polypropylene or higher glycol having a molecular weight of 2000 to 3000.

The polyether may generally be substituted for all or part of the polyesters in the heretofore noted polyester-diisocyanate elastomers. The selection of specific polyethers and polyisocyanates as well as the necessary operating conditions are shown in U.S. Patent 2,957,832.

Polyetheresterurethanes can also be produced by reacting the polyisocyanate with lactone polymers, preferably those having molecular weights within the range of about 500 to 10,000. These include polymers formed by reaction of polyfunctional initiators having reactive hydrogen atoms with one or more lactones, whereby the lactone rings are successively opened and added to one another as lactone residues to form long chains, as well as copolymers in which there are random or ordered distributions of opened lactone residues and alkylene oxides in the chains, and block copolymers thereof.

U.S. Patents 2,914,556; 2,962,524; 2,977,385; 3,051,687 disclose illustrative examples of processes and specific lactone derived polyetheresterurethanes.

As indicated in the foregoing patents, the lactone used as a starting material in the preparation of the polyester can be only lactone containing at least seven carbon atoms, or any combination of lactones in which at least one contains at least seven carbon atoms. This includes lactones having six carbon atoms in the ring and at least one carbon atom in a substituent on the ring, substituted and unsubstituted lactones having seven or more carbon atoms in the ring, and combinations of any one or several such lactones with one another or with unsubstituted lactones having as few as six carbon atoms in the ring. In general, the lactones that are useful in this invention are represented by the general formula:

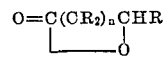

in which $n$ is at least four, at least $n+2$ R's are hydrogen, and the remaining R's are members selected from the group consisting of hydrogen, alkyl, cycloalkyl, alkoxy, and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperatures.

The lactones preferred are the epsilon-caprolactones having the general formula:

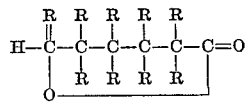

wherein at least six of the R's are hydrogen and the remainder are hydrogen, straight or branched chain alkyl, cycloalkyl, alkoxy or single ring aromatic hydrocarbon radicals, none of the substituents containing more than about twelve carbon atoms, and the total number of carbon atoms in the substituents on a lactone ring does not exceed about twelve. Unsubstituted epsilon-caprolactone in which all the R's are hydrogen, is derived from 6-hydroxyhexanoic acid. Substituted epsilon-caprolactones, and mixtures thereof, are available by conversion of various substituted cyclohexanones. The cyclohexanones may be obtained from substituted phenols or by other convenient synthetic resins.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the epsilon carbon atom, trialkyl epsilon-caprolactones in which two or three carbon atoms of the lactone are substituted, so long as the epsilon carbon atom is not disubstituted; alkoxy epsilon-caprolactones such as methoxy and ethoxy epsilon-caprolactones, and cycloalkyl, aryl, and aralkyl epsilon-caprolactones such as cyclohexyl, phenyl and benzyl epsilon-caprolactones. Mixtures of substituted lactones and mixtures of substituted lactones with unsubstituted lactones have been found to be particularly useful.

Lactones having more than six carbon atoms in the ring, e.g., zeta-nantholactone and eta-caprylolactone can also be reacted with bifunctional initiators in order to prepare the polyesters.

The lactone residues in heteric and block copolymers may be linked by oxyalkylene chains derived from ethylene oxide, propylene oxide, butylene oxide or the like, and by polyoxyalkylene chains, e.g., polyoxypropylene polyoxyethylene, polyoxybutylene chains or mixtures of copolymers thereof.

Additional examples of polyester and polyether-urethanes, their preparation and use are found in articles by J. H. Saunders, Rubber Chemistry and Technology, pages 1259–1292 (1960), by O. Bayer et al., 23 Rubber Chemistry and Technology 812–835 (1950), and E. Muller et al., 26 Rubber Chemistry and Technology 493–509 (1953).

Attempts have been made to overcome the problems of blocking and tackiness of urethane films through the use of surface agents such as talc, silicious chalk, hard paraffin or fatty acid derivatives, or the incorporation of such material into the resin, or curing beyond the tacky state. The use of lower processing temperatures were also necessary with these tacky film forming resins and resin compositions in order to prevent undue sticking of the resin to the processing equipment.

These proposed solutions have only limited desirability because of the attendant side effects, as for example, the lowering of processing temperatures often interfered with the production of smooth sheet surfaces and curing generally increased the rigidity of the polymer.

The use of additives were not heretofore, of themselves, sufficient to overcome problems such as the sticking of the polymer to the equipment during processing. In addition, the blocking of inner surfaces of films formed by slitting tubes made by the hot-blown tube method, particularly when passed through squeeze rolls, still occurred.

In low gauge films, such as those on the order of less than about 3 mils, problems such as surface tackiness and blocking are particularly acute because of the lack of rigidity, of such films. The use of such low gauge film was heretofore not practical because the additives employed failed to adequately overcome the problems of surface tackiness and blocking.

The additive system which is employed in the present invention is critical both in regard to ingredients and quantities. This is in contradistinction to U.S. Patent 2,729,618 which describes the use of "several percent of hard paraffin or fatty acid derivatives" to prevent sticking. Fillers such as carbon black, titanium dioxide or silicious chalk are also indicated as possibilities for producing improved workability of the material. It is also stated, however, that the "temperature is to be kept low," thus indicating the lack of effectiveness of the fillers and additives.

The additive system of the present invention, unlike those previously proposed, not only permits the use of high operating temperatures during processing without sticking being encountered, but also reduces the tacky surface characteristics and the blocking characteristics of article formed of the polyurethane compositions. The present system thus has the advantage of providing desired polymer characteristics without the need to resort to, for example, increased cross-linking, longer chain lengths or the like, thus eliminating the need to sacrifice properties such as resiliency and flexibility.

One component of the system of the present invention is an amide of a fat-forming fatty acid which includes mono amides and bis amides.

The desired results are obtained with amides of fat-forming fatty acids having the formula

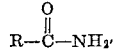

wherein R is a saturated or unsaturated aliphatic group, such as lauramide, palmitamide, stearamide, oleamide and erucamide, as well as the bis amides of fat-forming fatty acids, having the formula

wherein R and R″ are the same or different fat-forming fatty acids and $R^1$ is an aliphatic group having from 1 to 4 carbons, such as methylene-bis-stearamide, methylene-bis-oleamide, ethylene-bis-stearamide and ethylene-bis-oleamide. It is to be understood that the amides can be used singularly or in combination.

The other component of the system of the present invention is a particulate inert ingredient such as talc, feldspar, diatomaceous earth, mica, carbon black, and calcium or sodium bicarbonate. The essential characteristics of the ingredient are that it is substantially inert with regard to the polymer composition and that it be finely divided, preferably having an average particle size from about 1 to about 6 microns.

The additive system is present in an amount of at least 1.5 parts and in sufficient quantity to impart substantially non-blocking and non-tacky characteristics to the surface of the structure and consisting of at least 0.5 part and preferably 1 to 4 parts of the amide of the fat-forming fatty acid, and at least 1 part and preferably 2 to 15 parts of the inert ingredient.

The invention will be more readily understood from the following examples wherein parts and percentages are by weight.

Example 1

Polyesterurethane resin, diatomaceous earth and N,N'-ethylene bis oleamide are mixed in a ratio of 97/3/1 in a compounding extruder. The linear polyesterurethane resin is made from 1,4-butanediol, adipic acid and diphenyl methane-p, p'-diisocyanate as described in U.S. Patent 2,871,218. The resin has a specific gravity of 1.2 and is characterized by having a Shore Durometer hardness of 88A, a tensile strength (p.s.i.) of 8900, a 300% modulus (p.s.i.) of 1830, and an elongation of 590% in films formed of substantially 100% of the resin. It is available under the name Estane VC 5740X1. For simplicity, the resin will hereinafter be referred to as Estane 1.

The diatomaceous earth which is employed in the mixture has an average particle size between 2 and 4 microns.

The mixture is extruded into a 2.2 mil film by hot melt extruding and tubular expansion process of U.S. Patents 2,461,975 and 2,632,206.

The film has a non-tacky, non-blocking surface, and two halves of flattened tubing are manually separable.

The following tables set out further illustrative examples of polyurethane-additive system compositions in parts per hundred made in accordance with the procedure of Example 1.

Values of combinations of various polyurethanes with various amide-inert addition systems are represented by the term "Film Rating," which refers to the tendency of film to block and to the tackiness or dryness of the surface of the film. The letter A denotes a highly desirable commercial non-blocking film, B denotes a commercially acceptable non-blocking film, and C denotes a film which blocks too severely to be commercially acceptable. To qualify for an A rating the two layers of a flattened tubing have to be manually easily separable. The films rated B require the use of mechanical means, such as pressure sensitive tape to separate the two layers of a flattened tubing or are opened manually but only with difficulty and have, at most, a slightly tacky surface. The C films block to themselves, particularly when passed through squeeze rolls during processing and open mechanically with difficulty or do not open at all.

The polyurethane represented in Table I as "Estane 10" is similar to the resin of Example I, except in that the Shore Durometer hardness is 78A, the tensile strength (p.s.i.) is 8900, the 300% modulus (p.s.i.) is 1490, and the elongation is 460%, and is available under the name Estane VC 5740X10.

The polyurethane represented in Table II as "Estane 7" is similar to the resin of Example I, except in that the Shore Durometer hardness is 49D, the tensile strength (p.s.i.) is 11,300, the 300% modulus (p.s.i.) is 4650 and the elongation is 500%, and is available under the name Estane VC 5740X7.

The polyurethanes of Table III are similar to those of Tables I and II in that they are derived from a polyester and diphenyl methane diisocyanate, but in the polyurethanes availabe under the names Texin 480A and Texin 192A, a diol is employed as a crosslinking agent. Texin 480A has a specific gravity of 1.23 and is characterized by having a Shore Durometer hardness of 80A, a tensile strength (p.s.i.) from about 6500 to 8000, an elongation of from about 550 to 650, and 300% modulus of from about 1700 to 2200, in films formed of substantially 100% of the resin. Texin 192A is similar to that of Texin 480A, except that it has a Shore Durometer hardness of 90A, a tensile strength (p.s.i.) of from about 4500 to 6000, an elongation of from about 530 to 650, a specific gravity of 1.25, and a 300% modulus of 2000–2800.

The term fat-forming fatty acids as herein used is definitive of those fatty acids present as such or as glycerides in natural fats. The Yearbook of Agriculture, 1959 Food, U.S. Department of Agriculture, page 716, defines "fat" as follows:

A glyceryl ester of fatty acids. Fats generally are substances of plant animal origin. Fat may be in solid form, as butter, margarine, or other shortening, or in liquid form, as the vegetable oils.

The fat-forming fatty acids useful in the practice of this invention can be prepared by known procedures, as for example by the glycerolysis of natural fats or oils, these being essentially mixtures of various fatty acid triglycerides. Upon glycerolysis of such oils or fats, there is usually obtained a complex mixture including free fatty acids. The components of such mixtures can be separated by suitable distillation procedures.

Illustrative examples of fat-forming fatty acids effective for the purposes of this invention are those obtained by the hydrolysis of such fats or oils as beef tallow, mutton tallow, butter fat, coconut oil, corn oil, cotton seed oil, lard oil, olive oil, peanut oil, soy bean oil and sesame oil.

TABLE I

| Estane 10 | Ethylene bis Oleamide | Diatomaceous Earth | Film Rating |
|---|---|---|---|
| 100 | | | C |
| 97 | | 3 | C |
| 90 | | 10 | C |
| 93.75 | 0.25 | 6 | C |
| 93.50 | 0.5 | 6 | B |
| 91.50 | 0.5 | 8 | A |
| 93.25 | 0.75 | 6 | A |
| 97 | 1 | 2 | B |
| 96 | 1 | 3 | B |
| 95 | 1 | 4 | A |
| 93 | 1 | 6 | A |
| 94 | 1 | 15 | A |
| 98 | 2 | 0 | C |
| 97 | 2 | 1 | B |
| 94 | 2 | 4 | B |
| 93 | 2 | 5 | A |
| 92 | 2 | 6 | A |
| 97 | 3 | 0 | C |
| 96 | 3 | 1 | B |
| 93 | 3 | 4 | B |
| 92 | 3 | 5 | A |
| 91 | 3 | 6 | A |
| 96 | 4 | 0 | C |
| 95 | 4 | 1 | B |
| 93 | 4 | 3 | B |
| 90 | 4 | 6 | A |

TABLE II

| Estane 10 | Ethylene bis Oleamide | Ethylene bis Stearamide | Diatomaceous Earth | Film Rating |
|---|---|---|---|---|
| 98 | 0 | 2 | 0 | C |
| 93 | 0 | 1 | 6 | B |
| 92 | 0 | 2 | 6 | B |
| 91 | 0 | 3 | 6 | B |
| 98 | 1 | 1 | 0 | C |
| 92.75 | .25 | 1 | 6 | B |
| 92.50 | .50 | 1 | 6 | B |
| 96 | 1 | 1 | 2 | B |
| 95 | 1 | 1 | 3 | B |
| 94 | 1 | 1 | 4 | B |

TABLE III

| Estane 7 | Ethylene bis Oleamide | Ethylene bis Stearamide | Diatomaceous Earth | Film Rating |
|---|---|---|---|---|
| 97.75 | .25 | 0 | 2 | C |
| 97.50 | .50 | 0 | 2 | B |
| 98.50 | .50 | 0 | 1 | B |
| 93.50 | .50 | 0 | 6 | A |
| 98 | 1 | 0 | 1 | A |
| 97 | 1 | 0 | 2 | A |
| 93 | 1 | 0 | 6 | A |
| 98 | 2 | 0 | 0 | C |
| 97 | 2 | 0 | 1 | A |
| 96 | 2 | 0 | 2 | A |
| 92 | 2 | 0 | 6 | A |
| 96 | 3 | 0 | 1 | A |
| 98 | 0 | 2 | 0 | C |
| 98 | 0 | 1 | 1 | B |
| 96 | 0 | 1 | 3 | A |
| 97 | 0 | 2 | 1 | A |
| 96 | 0 | 2 | 2 | A |
| 97.75 | .25 | 1 | 1 | A |
| 97.50 | .50 | 1 | 1 | A |

TABLE IV

| Polyurethane | Percent | Ethylene bis Oleamide | Diatomaceous Earth | Film Rating |
|---|---|---|---|---|
| Texin 480A | 96 | 1 | 3 | A |
| Do | 93 | 1 | 6 | A |
| Do | 91 | 1 | 8 | A |
| Do | 97 | 2 | 1 | B |
| Do | 95 | 2 | 3 | A |
| Do | 100 | 0 | 0 | C |
| Texin 192A | 100 | 0 | 0 | C |

TABLE V

| Estane 10 | Erucamide | Stearamide | Diatomaceous Earth | Film Rating |
|---|---|---|---|---|
| 93 | 0 | 1 | 6 | B |
| 89 | 0 | 1 | 10 | B |
| 98 | 0 | 2 | 0 | C |
| 92 | 0 | 2 | 6 | B |
| 88 | 0 | 2 | 10 | B |
| 96 | 0 | 4 | 0 | C |
| 93 | 1 | 0 | 6 | B |
| 92 | 2 | 0 | 6 | B |
| 88 | 2 | 0 | 10 | B |
| 91 | 3 | 0 | 6 | B |
| 87 | 3 | 0 | 10 | B |

TABLE VI

| Estane 10 | Ethylene bis Oleamide | Silica | Film Rating |
|---|---|---|---|
| 95 | 3 | 2 | B |
| 89 | 1 | 10 | B |

TABLE VII

| Amide, 1 part | Estane 10 | Diatomaceous Earth | Film Rating |
|---|---|---|---|
| Palmitamide | 93 | 6 | B |
| Stearamide | 93 | 6 | B |
| Erucamide | 93 | 6 | B |
| Ethylene-bis-stearamide | 93 | 6 | B |
| Methylene-bis stearamide | 93 | 6 | B |

TABLE VIII

Estane 10, 93 parts; Ethylene-bis-oleamide 1 part; and 6 parts:

| | Film rating |
|---|---|
| Diatomaceous earth, 1–2 microns | A |
| Diatomaceous earth, 2–6 microns | A |
| Feldspar, 1.5 microns | A |
| Feldspar, 1.1 microns | A |
| Mica | A |

As evident from Table I, the use of as much as 10 parts diatomaceous earth alone failed to significantly improve the qualities of unmodified film. Similarly, the use of 4 parts ethylene bits oleamide alone failed to adequately improve the film. The use of less than 0.5 part of the bisamide, even in combination with as much as 6 parts of the inert proved to be unsuccessful. The use of 10 parts of the inert with 0.5 part of the bisamide yielded an excellent film, which was somewhat translucent. Further increases in the quantity of the inert solid yield highly desirable commercial films with increased translucency.

The best results were obtained when the inert was employed in an amount greater than 4 parts but less than 15 parts. In order to operate with low inert concentration, the use of at least about 1 part bisamide is preferred.

It is within the scope of this invention to employ various combinations of amides and/or various combinations of the inert additive. Thus, while ethylene bis stearamide and ethylene bis oleamide in combinaton, but without any inert present, fail to produce the requisite properties in the film, the bisamide combination when used with diatomaceous earth yielded a commercially acceptable film.

Tables III and IV show the additive systems produce substantially the same type of results with various polyurethanes.

It is seen in Table V that the monoamides also can be employed in the additive system. The bisamides are preferred, however, because of their ability to yield higher quailty films than generally attainable with the monoamide.

Tables VI, VII, and VIII show the use of additional amides and finely particulate inerts.

STRUCTURE PRODUCTION

Example A

Employing the operation set forth in Example 1, 93 parts of the polyesterurethane, available under the name Estane 5740X10, is mixed with 1 part ethylene bis oleamide and 6 parts diatomaceous earth and extruded in the form of a 0.5 mil tubular film. Employing a conventional heat sealing technique, a hand shaped heat seal pattern was imposed on the film and excess material cut away, thereby producing a glove.

Even though the glove film exhibited extreme pliability, blocking was not found to be a problem. The high moisture permeability (about 40 gms./100 sq. in./24 hours/mil thickness) of the extremely thin gloves make them comfortable to wear for extended periods of time.

The gloves are also found to provide good palpability, that is, a substantially unaffected sense of touch. In this regard, the gloves had characteristics which are desired in surgeons gloves, but which conventional gloves cannot provide. The use of as much as 2 mil film but preferably no greater than 1 mil thickness results in a glove of such light weight that the cost per pair of gloves is low, notwithstanding a high cost per pound of material.

Example B

A composition consisting basically of 2 parts N,N'-ethylene bis oleamide, 1 part diatomaceous earth and 10 parts of a magnetic iron oxide available under the name IRN 220, and 93 parts of the linear polyesterurethane available under the name Estane 5740X7, are processed in the manner set forth in Example I, and a 1 mil thick, 0.25 inch wide film is produced, and employed as a magnetic recording tape in a conventional tape recording apparatus. The tape is found to have useful reproduction ability.

The film is found to have a tensile strength, in the machine direction (M.D.) of 12,800 p.s.i. and in the transverse direction (T.D.) of 7700 p.s.i. The film can be stretched 580% (M.D.) and 640% (T.D.) prior to breaking. At 10% elongation, the stress is found to be 570 p.s.i. (M.D.) and 530 p.s.i. (T.D.).

Sound recorders, computers and the like, can be out of synchronization in a manner such that when the apparatus is stopped, the take up reel continues to wind up tape for an instant longer than the feeding reel supplies tape. The result is a sudden pull on the tape which causes a strain on the reel winding and unwinding mechanism. Particularly in sensitive equipment such as computers, a jolt or shock can be produced which is sufficiently great to damage the piece of equipment.

Employing the magnetic tape of the instant invention, a tape recorder is synchronized to specifically cause the take up reel to continue for an instant longer than the unwind reel. The resiliently of the film is found to be adequate to compensate for the sudden pull on the tape thereby eliminating the shock which is evident when conventional tapes are employed. The stretching of the tape is not found to produce any significant audio distortion.

The audio distortion can be further reduced when greater fidelity is required by producing a film having a higher degree of orientation and/or employing a higher modulus polyurethane, in order to properly limit the degree of elasticity or resiliency of the film. Tensile strengths of 38,000 p.s.i. (M.D.) and 6,500 p.s.i. (T.D.), elongations at break of 200% (M.D.) and 1400% (T.D.) and stresses of 900 p.s.i. (M.D.) and 620 p.s.i. (T.D.) at 10% elongation can thus be produced for use in the tape of Example B.

Example C

As in accordance with Example A, tubular film is made by the hot blown tube method. A die is employed to cut a pattern in the form of baby pants. Two edges of the patterned film were heat sealed together by conventional heat sealing equipment.

The properties of the aforementioned polyurethane compositions, such as, resistance to radiation deterioration; non-blocking, non-tacky surfaces; high moisture permeability; flexibility; elasticity; high abrasion resistance; inertness, especially to oils, fats, and grease; clarity; and durability at low temperature, make the film, film laminates or fibers admirably suitable for numerous uses. Illustrative of such uses are: films such as oil, fat and grease barriers; tapes, such as reinforcing or adhesive tapes; drum or container liners; balloons; diaphragms; magnetic tapes; containers; packaging films and packages, especially for edibles; comfortable garments such as water-proof rain wear, bathing or shower caps, baby pants, overshoes, dress shields and gloves, and foundation garments such as girdles, brassieres, knee supports, stockings and support stockings; surgical or prophylactic items such as colostomy bags, bandages, hospital sheets, pillow or mattress covers; molded articles such as sausage casing shirring rolls and gears; and surface coatings or laminates such as for abrasion resistant machine parts and luggage; surface coatings such as for synthetic leather and the like; packages of sterilized items which have been subjected to sterilization radiation; or a component of the aforementioned.

It is obvious that many changes and modifications can be made in the above-described details without departing from the nature and spirit of the invention, as for example, other components such as lubricants, antistatic agents, anti-oxidants, coloring matter and the like can be added to the composition of the present invention.

GLOSSARY OF TERMS

Tensile strength is measured in accordance with the test method set forth in ASTM D412–61T and is in pounds per square inch (p.s.i.).

Elongation is the percent elongation at break as measured by the test method set forth in ASTM D412–61T.

300% modulus is the tensile modulus in pounds per square inch (p.s.i.) at 300% elongation and is measured by the test method set forth in ASTM D 412–61T.

Shore Durometer hardness is measured in accordance with the test method set forth in ASTM D676–59T.

Parts and percentages are by weight.

What is claimed is:

1. A composition for use in the formation of non-tacky, non-blocking formed structures from polyurethane, comprising:
   (a) a normally tacky structure forming polyurethane, and
   (b) an additive system to impart substantially non-blocking and nontacky characteristics to the structure consisting essentially of
      (1) from between about 0.5 to 4.0 parts of an amide of a fat-forming fatty acid, said amide being selected from the class having the general formulae

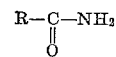

wherein R is an aliphatic group obtained from a fat-forming fatty acid and

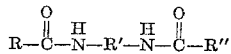

wherein each one of R and R'' is an aliphatic group obtained from a fat-forming fatty acid and R' is an aliphatic group having from between about 1 to 4 carbon atoms, and
      (2) from between about 1 to 15 parts of a finely divided, particulate solid that is inert to the polymeric composition.

2. The composition of claim 1, wherein the amide is arucamide.
3. The composition of claim 1, wherein the amide is oleamide.
4. The composition of claim 1, wherein the amide is stearamide.
5. The composition of claim 1, wherein the amide has the formula

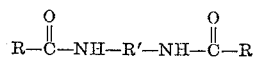

where R is an aliphatic group having 17 carbons, and R' is an aliphatic group having from 1 to 2 carbons.
6. The composition of claim 1, wherein the amide is alkylene bis oleamide.
7. The composition of claim 5, wherein the amide is alkylene bis stearamide.
8. The composition of claim 1, wherein the inert solid is a finely divided inert silicious material.
9. The composition of claim 1, wherein the inert solid is diatomaceous earth.
10. The composition of claim 1, wherein (1) is present in an amount greater than 1 part and (2) is present in an amount greater than 2 parts.
11. The composition of claim 1, wherein (2) is an average particle size from about 1 to 6 microns.
12. The composition of claim 1, wherein the polyurethane is a polyesterurethane.
13. The composition of claim 1, wherein the polyurethane is a polyetherurethane.
14. The composition of claim 1, wherein the polyester is derived from a lactone having at least 7 carbons.
15. The composition of claim 1, wherein the polyurethane is a polyesteretherurethane.
16. The composition of claim 1, wherein the polyurethane is derived from an aromatic diisocyanate.
17. A shaped structure having substantially non-tacky, non-blocking surfaces comprising:
   (a) a normally tacky structure forming polyurethane, and
   (b) an additive system to impart substantially non-blocking and non-tacky characteristics to the structure consisting essentially of
      (1) from between about 0.5 to 4.0 parts of an amide of a fat-forming fatty acid, said amide being selected from the class having the general formulae

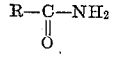

wherein R is an aliphatic group obtained from a fat-forming fatty acid and

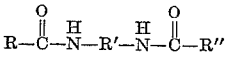

wherein each one of R and R'' is an aliphatic group obtained from a fat-forming fatty acid and R' is an aliphatic group having from between about 1 to 4 carbon atoms, and (2) from between about 1 to 15 parts of a finely divided, particulate solid that is inert to the polymeric composition.

18. The shaped structure of claim 17, wherein (1) is erucamide.

19. The shaped structure of claim 17, wherein (1) is stearamide.

20. The shaped structure of claim 19, wherein (1) is a bisamide having the formula

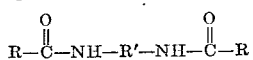

where R is an aliphatic group having 17 carbons, and R' is an aliphatic group having from 1 to 2 carbons.

21. The shaped structure of claim 17, wherein (2) is a diatocaceous earth.

22. The shaped structure of claim 17, wherein (a) is substantially linear polyesterurethane.

23. A glove having improved permeability to moisture and palpability formed from a non-tacky, non-blocking film, said film comprising:
 (a) a normally tacky structure forming polyurethane, and
 (b) an additive system to impart substantially non-blocking and non-tacky characteristics to the structure consisting essentially of
  (1) from between about 0.5 to 4.0 parts of an amide of a fat-forming fatty acid, said amide being selected from the class having the general formulae

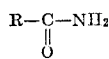

wherein R is an aliphatic group obtained from a fat-forming fatty acid and

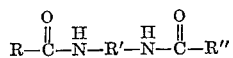

wherein each one of R and R" is an aliphatic group obtained from a fat-forming fatty acid and R' is an aliphatic group having from between about 1 to 4 carbon atoms, and
  (2) from between about 1 to 15 parts of a finely divided, particulate solid that is inert to the polymeric composition.

24. A tape for use in magnetic recorders and the like, comprising:
 (a) a normally tacky structure forming polyurethane, and
 (b) an additive system to impart substantially non-blocking and non-tacky characteristics to the structure consisting essentially of
  (1) from between about 0.5 to 4.0 parts of an amide of a fat-forming fatty acid, said amide being selected from the class having the general formulae

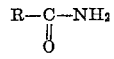

wherein R is an aliphatic group obtained from a fat-forming fatty acid and

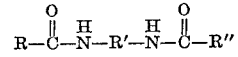

wherein each one of R and R" is an aliphatic group obtained from a fat-forming fatty acid and R' is an aliphatic group having from between about 1 to 4 carbon atoms, and (2) from between about 1 to 15 parts of a finely divided, particulate solid that is inert to the polymeric composition.

25. The shaped structure as defined in claim 17, wherein said structure is a self-supporting film.

26. The shaped structure as defined in claim 17, wherein said structure is a molded product.

27. The shaped structure as defined in claim 17, wherein said structure is a surface coating.

28. In the method of mixing and forming a polyurethane elastomer to obtain a structure, the improvement comprising adding to the homogeneous mixture formed from a normally tacky polyurethane an additive system consisting essentially of from between about 0.5 to 4.0 parts of an amide of a fat-forming fatty acid, said amide being selected from the class having the general formulae.

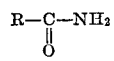

wherein R is an aliphatic group obtained from a fat-forming fatty acid and

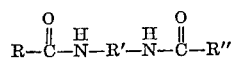

wherein each one of R and R" is an aliphatic group obtained from a fat-forming fatty acid and R' is an aliphatic group having from between about 1 to 4 carbon atoms, and from between about 1 to 15 parts of a finely divided, particulate solid that is inert to the polymeric composition, and thereafter forming said mixture into a structure which is characterized in that said structure exhibits anti-blocking and non-tacky surface properties while said structure retains its resilience and flexibility characteristics.

29. In the method of mixing and forming a substantially linear polyesterurethane elastomer, the improvement comprising adding to the homogeneous mixture formed from a substantially linear polyesterurethane elastomer an additive system consisting essentially of from between about 0.5 to 4.0 parts of an amide of a fat-forming fatty acid, said amide being selected from the class having the general formulae

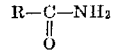

wherein R is an aliphatic group obtained from a fat-forming fatty acid and

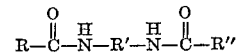

wherein each one of R and R" is an aliphatic group obtained from a fat-forming fatty acid and R" is an aliphatic group having from between about 1 to 4 carbon atoms, and from between about 1 to 15 parts of a finely divided, particulate solid that is inert to the polymeric composition such that there is imparted to said polyesteurethane elastomer anti-blocking and nontacky surface properties.

References Cited

UNITED STATES PATENTS

| | | | |
|---|---|---|---|
| 2,765,293 | 10/1956 | Happoldt | 260—32.6 |
| 2,993,022 | 7/1961 | Coler | 260—32.6 |
| 3,021,296 | 2/1962 | Ammondson | 260—32.6 |
| 3,227,666 | 1/1966 | Showalter | 260—37 |

MORRIS LIEBMAN, *Primary Examiner.*

L. T. JACOBS, *Assistant Examiner.*